Patented Sept. 26, 1922.

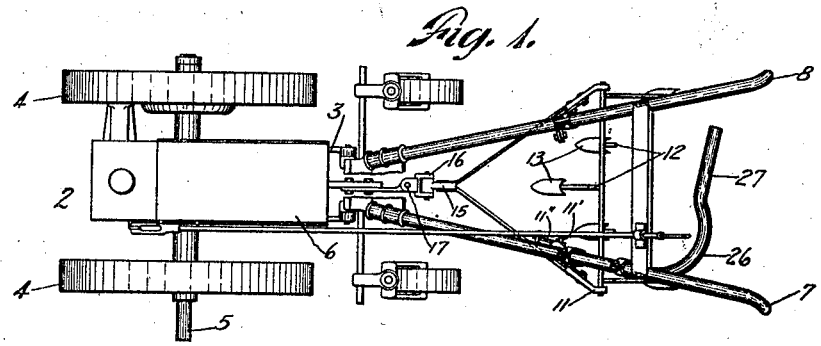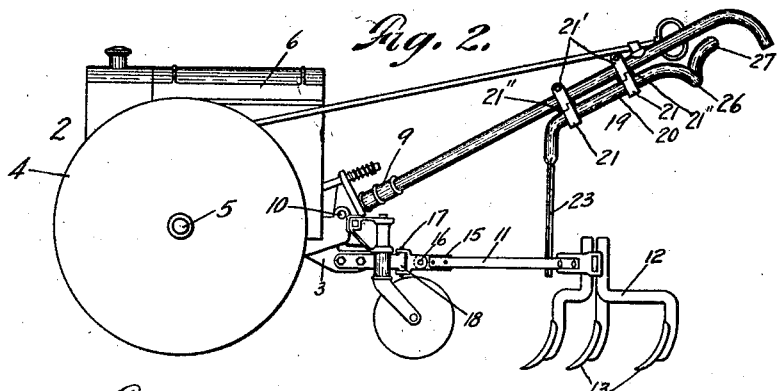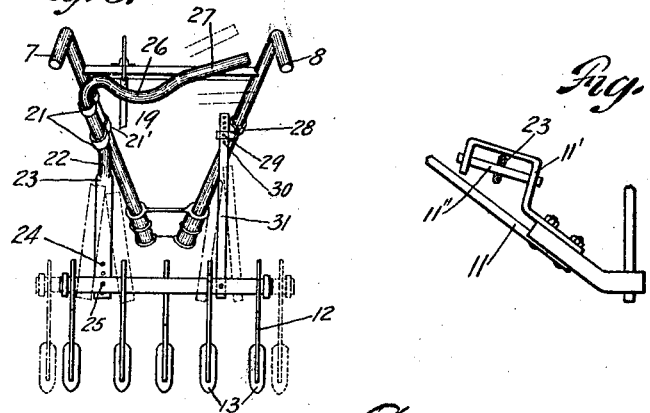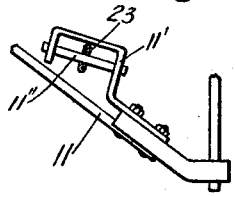

1,429,946

UNITED STATES PATENT OFFICE.

GEORGE O. HODGE, OF BRISTOL, CONNECTICUT, ASSIGNOR TO THE NEW BRITAIN MACHINE COMPANY, OF NEW BRITAIN, CONNECTICUT, A CORPORATION OF CONNECTICUT.

POWER-OPERATED FARMING IMPLEMENT.

Application filed February 18, 1921. Serial No. 445,983.

*To all whom it may concern:*

Be it known that GEORGE O. HODGE, a citizen of the United States, residing at Bristol, in the county of Hartford and State of Connecticut, has invented certain new and useful Improvements in Power-Operated Farming Implements, of which the following is a specification.

This invention relates to a power operated farming implement, the primary object of the invention being to provide means of a simple and effective nature by which the implement, generally but not essentially a cultivator, can be laterally adjusted as required with respect to the power appliance which desirably consists of a tractor, the propelling effect of which is brought about through the agency of a suitable hydrocarbon fluid.

The invention comprises other features of novelty and advantage which with the foregoing will be set forth at length in the following description wherein I will outline in detail that form of embodiment of the invention which I have selected for illustration in the drawings accompanying and forming part of the present specification. I am not restricted to this disclosure. I may depart therefrom in several respects within the scope of the invention defined by the claims following said description.

Referring to said drawings:

Figure 1 is a top plan view of an appliance involving the invention.

Fig. 2 is a side elevation and

Fig. 3 is a rear elevation of the same.

Fig. 4 is a detail by which a certain adjustment hereinafter described can be effected.

Like characters refer to like parts throughout the several views.

The power by which the farming implement can be propelled, is desirably obtained by a tractor or a similar wheeled vehicle such as that denoted in a general way by 2. This tractor comprises a frame or body 3 furnished at its sides with traction wheels as 4 to travel upon ground and supported by an axle as 5. The engine by which the tractor is driven is denoted in a general way by 6. Associated with the rear portion of the frame or body of the tractor or equivalent wheeled vehicle, are controlling handles as 7 and 8, these handles having at their rear ends grasping portions generally arched or curved to be grasped by the hands of the user, converging forwardly and being connected at their forward ends with the bracket 9 pivoted as at 10 to the rear upper portion of the wheeled frame or body 3. The pivot 10 is therefore horizontally disposed so that the controlling handles which are employed in steering the vehicle can be raised or lowered, this action in the present case being for raising or lowering the farming implement of whatever nature it may be although the lateral movement of the farming implement is obtained independently or entirely distinctly from the action of the handles or either of them because so far as lateral or side adjustment of the farming implement is concerned, the handles in question or their equivalent might be stationary. The tractor briefly described is fully set forth in several applications already on file by me and therefore requires no further description.

The agricultural or farming implement shown is in the form of a cultivator and as represented it comprises a frame or body 11 of practically triangular form, the rear cross bar having connected with it the shanks 12 of the cultivator shoes or blades 13, the shanks being generally rigidly connected with their frame. The side bars of the cultivator frame at their point of convergence are united rigidly with a head piece as at 15 pivoted between the rear branches of the yoke 16 the pivot 15 being horizontal to thus permit the raising or lowering of the cultivator frame. The yoke 16 has forward branches which receive between them the pivot 17 extending through the rear end of the bearing 18, said rear end of the bearing as will be clear pivotally fitting between the forward branches of the yoke and the shank of said bearing being attached generally by bolts or screws to the rear end of the frame of body 3 of the tractor. This pivot 17 permits the cultivator frame 11 to be adjusted sidewise to conform to the conditions with which the tractor meets in action. The lateral or side adjustments of the cultivator frame 11 is effected by a suitable actuator such as that denoted in a general way by 19. As shown said actuator comprises a body or main portion 20 having connected to it the longitudinally separated clamps 21 which as shown are flexibly connected to the similarly longitudinally separated clamps 21' on the handle 7, pivots as 21" being shown as connecting the two sets of clamps respectively with each other. From this it will be clear that the actuator 19 is capable of rocking or oscillating motion. The body or main portion 20 follows somewhat the trend of the handle 7 which like the complemental handle 8 is down and forward. Said body or main portion has at its front end a depending extension 22 furnished as shown with a lower flattened portion 23 having a vertical series or row of perforations adapted to interchangeably receive a pin as 11" connected with the rear end of the cultivator by reason of which the connection between the actuator 19 and the cultivator frame can be adjusted to meet desired conditions. As represented the side branch of the frame of the cultivator, in proximity to the actuator 19, has fastened to it as by bolting the shank of the yoke 11' the branches of which removably sustain the pin or stud 11" which as I have already explained is adapted to interchangeably enter the holes or perforations 24. The flattened portion 23 it will be clear may slide on the pin or stud 11" by reason of which fact the connection is not affected notwithstanding the fact that the frame of the cultivator moves about two axes. The rear and upper end of the actuator 19 as shown is furnished with a lateral extension 26 which is between the controlling handles 7 and 8 and which as a matter of convenience is downwardly arched and terminates in a handle or grasping portion 27 situated between the tractor-controlling handles 7 and 8. As shown the controlling handle 8 has clamped to it the bearing 28 carrying the stud or bolt 29 adapted to interchangeably enter one of the row of holes 30 near the upper end of the link or strip 31 connected rigidly in some convenient way to the rear transverse bar of the cultivator frame 11.

It will be clear that upon raising the controlling handles 7 and 8, the cultivator frame can be raised and the converse on the lowering of the handles. The terminal or handle portion 27 is within convenient reach of the attendant of the machine who holds the grasping portions at the rear ends of the controlling handles 7 and 8 and he can shift for instance his right hand from the controlling handle 8 and grasp the grasping portion 27 of the actuator 19 which constitutes a suitable controlling lever and by swinging it and through the connections described can adjust laterally the cultivator frame.

In Fig. 3 I have shown by dotted lines how the cultivator frame 11 can be adjusted laterally. In fact in this view I have shown by dotted lines the positions assumed by the several parts in two opposite side adjustments.

What I claim is:

The combination of a wheeled frame, controlling handles connected with the frame, an agricultural implement flexibly connected with the wheeled frame, an actuator, comprising a body portion provided with longitudinally separated clamps, one of the handles having longitudinally separated clamps to which the other clamps are flexibly connected, the actuator having a downward extension at its forward end operatively connected with the agricultural implement and having at its rear end a lateral extension situated between the controlling handles, the lateral extension terminating in a grasping portion adjacent to the handle portion of one of the handles.

In testimony whereof I affix my signature

GEORGE O. HODGE

Witnesses:
HEATH SUTHERLAND,
NEWTON E. BLAKE.